United States Patent
Warnaar et al.

(10) Patent No.: US 11,035,674 B2
(45) Date of Patent: Jun. 15, 2021

(54) GPS-DENIED GEOLOCATION

(71) Applicant: Applied Research Associates, Inc., Albuquerque, NM (US)

(72) Inventors: Dirk B. Warnaar, Raleigh, NC (US); David H. Johnson, Raleigh, NC (US)

(73) Assignee: Applied Research Associates, Inc., Albuquerque, NM (US)

( * ) Notice: Subject to any disclaimer, the term of this patent is extended or adjusted under 35 U.S.C. 154(b) by 218 days.

(21) Appl. No.: 16/413,187

(22) Filed: May 15, 2019

(65) Prior Publication Data

US 2020/0363207 A1 Nov. 19, 2020

(51) Int. Cl.
*G01C 21/00* (2006.01)
*G01C 3/00* (2006.01)
*G01C 9/00* (2006.01)
*G01C 15/00* (2006.01)

(52) U.S. Cl.
CPC ............ *G01C 21/005* (2013.01); *G01C 3/00* (2013.01); *G01C 9/00* (2013.01); *G01C 15/002* (2013.01)

(58) Field of Classification Search
USPC ........................................................ 702/154
See application file for complete search history.

(56) References Cited

U.S. PATENT DOCUMENTS

| | | | | |
|---|---|---|---|---|
| 5,420,592 A | * | 5/1995 | Johnson | G01S 11/10 342/357.46 |
| 10,152,635 B2 | | 12/2018 | Viswanathan | |
| 2010/0178934 A1 | * | 7/2010 | Moeglein | G01S 19/12 455/456.1 |
| 2012/0290199 A1 | * | 11/2012 | Nadam | G01C 21/005 701/409 |
| 2014/0009604 A1 | * | 1/2014 | Hinderling | G01C 15/002 348/142 |
| 2016/0247318 A2 | * | 8/2016 | Menozzi | G01S 19/51 |
| 2017/0356720 A1 | * | 12/2017 | Guthrie | G01S 17/42 |
| 2019/0383616 A1 | * | 12/2019 | Kirschner | G01C 21/08 |

* cited by examiner

*Primary Examiner* — Paul D Lee
(74) *Attorney, Agent, or Firm* — Erise IP, P.A.

(57) ABSTRACT

Systems and techniques for navigation in a GPS-denied environment that do not rely on locations of known points. Instead, the operator can measure distance and/or inclination as well as azimuth to arbitrary points on the visual horizon (or sub-horizon) from their location. These observations can then be compared to precomputed distances and inclinations for corresponding azimuths to the visual horizon of a grid of points based on known surface terrain data. The closest grid point to the observer's location obtained in this way can be refined using a model of the surrounding environment, allowing for the operators position to be quickly and accurately determined.

20 Claims, 6 Drawing Sheets

GPS-DENIED GEOLOCATION

BACKGROUND

1. Field

Embodiments of the invention generally relate to geolocation, and more particularly to techniques for determining the position of an operator in GPS-denied environments without relying on predetermined points of known location.

2. Related Art

Traditionally, determining an unknown location relies upon measuring angles (triangulation) or distances (trilateration) to predetermined points of known location (i.e., landmarks). As used herein, the term landmark will refer to a known location on some type of map and also measurable from the operator's position, where the operator is a person or a device whose position needs to be located on the map. For example, celestial navigation relies upon measuring the angles to known stars whose positions are recoded in ephemerides, thus serving as landmarks for geolocation. Similarly, global positioning system navigation relies on determining the distances to a number of satellites that continually broadcast their positions. However, in some circumstances, such as an urban canyon environment, GPS may be unavailable. Environments where GPS satellites are obscured, however, are the very environments where the predetermined points of known location useable for triangulation are also obscured. Existing methods for GPS-denied navigation rely on time-consuming manual methods such as resection. As such, what is needed is a technique that can quickly and automatically identify a location in GPS-denied environments without relying on landmarks.

SUMMARY

Embodiments of the invention address the above-described need by providing for novel techniques for navigation that do not rely on landmarks. Instead, the operator can measure arbitrary points on the visual horizon (or sub-horizon). By comparing these observations to a known surface terrain data, the operator's position can be determined quickly and accurately, even where the surface terrain data includes some degree of noise or inaccuracy. In particular, in a first embodiment, the invention includes a method for determining the location of an operator, comprising the steps of receiving a first range, a first inclination and a first azimuth of a first point on a visible horizon based on a first measurement by the operator; filtering a set of grid points based on the first inclination and the first azimuth by eliminating from consideration a candidate grid point of the set of grid points if a computed inclination at the first azimuth for the candidate grid point varies by more than an inclination error threshold from the first inclination; further filtering the set of grid points based on the first range and the first azimuth by eliminating from consideration the candidate grid point if a computed range at the first azimuth for the candidate grid point varies by more than a range error threshold from the first range; determining a best grid point of the set of grid points by determining that the best grid points has a minimal weighted residual sum over the candidate grid points; and refining the location of the operator based on the best grid point by determining a refined location with a smaller weighted residual sum than the best grid point.

In a second embodiment, the invention includes or more non-transitory computer-readable media storing computer-executable instruction that, when executed by a processor, perform a method of determining a location of an operator, the method comprising the steps of receiving a first range, a first inclination and a first azimuth of a first point on a visible horizon based on a first measurement by the operator; filtering a set of grid points based on the first inclination and the first azimuth by eliminating from consideration a candidate grid point of the set of grid points if a computed inclination at the first azimuth for the candidate grid point varies by more than an inclination error threshold from the first inclination; further filtering the set of grid points based on the first range and the first azimuth by eliminating from consideration the candidate grid point if a computed range at the first azimuth for the candidate grid point varies by more than a range error threshold from the first range; receiving a second range, a second inclination and a second azimuth of a second point on a visible horizon based on a second measurement by the operator; further filtering the set of grid points based on the second inclination and the second azimuth by eliminating from consideration the candidate grid point if a computed inclination at the second azimuth for the candidate grid point varies by more than the inclination error threshold from the second inclination; further filtering the set of grid points based on the second range and the second azimuth by eliminating from consideration the candidate grid point if a computed range at the second azimuth for the candidate grid point varies by more than a range error threshold from the second range; determining a best grid point of the set of grid points by determining that the best grid points has a minimal weighted residual sum over the candidate grid points; and refining the location of the operator based on the best grid point by determining a refined location with a smaller weighted residual sum than the best grid point.

In a third embodiment, the invention includes a system for determining the position of an operator, comprising a processor; a display; a laser rangefinder; an inclinometer; a compass; and one or more non-transitory computer-readable media storing computer-executable instruction that, when executed by the processor, perform a method of determining a location of an operator, the method comprising the steps of: receiving a first range from the laser rangefinder, a first inclination from the inclinometer and a first azimuth from the compass of a first point on a visible horizon based on a first measurement by the operator; filtering a set of grid points stored on the computer-readable medium based on the first inclination and the first azimuth by eliminating from consideration a candidate grid point of the set of grid points if a computed inclination at the first azimuth for the candidate grid point varies by more than an inclination error threshold from the first inclination; further filtering the set of grid points based on the first range and the first azimuth by eliminating from consideration the candidate grid point if a computed range at the first azimuth for the candidate grid point varies by more than a range error threshold from the first range; determining a best grid point of the set of grid points by determining that the best grid points has a minimal weighted residual sum over the candidate grid points; refining the location of the operator based on the best grid point by determining a refined location with a smaller weighted residual sum than the best grid point; and displaying the refined location of the operator on the display.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTIONS OF THE DRAWING FEATURES

Embodiments of the invention are described in detail below with reference to the attached drawing figures, wherein.

The drawings do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention perform geolocation in environments where GPS may be degraded or unavailable. In particular, embodiments of the invention can determine the operator's precise location based on measured distances and angles to unknown points. Unlike previous geolocation techniques based on triangulation or trilateration, no landmarks are required. Instead, an operator can determine a precise location using only the azimuth, inclination and distance (or, in some embodiments, any two of these three measurements) to a set of arbitrarily selected points on the visible horizon or sub-horizon. In this way, an operator can quickly and conveniently determine their location in GPS-denied environments without requiring time-consuming resection techniques.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 1:
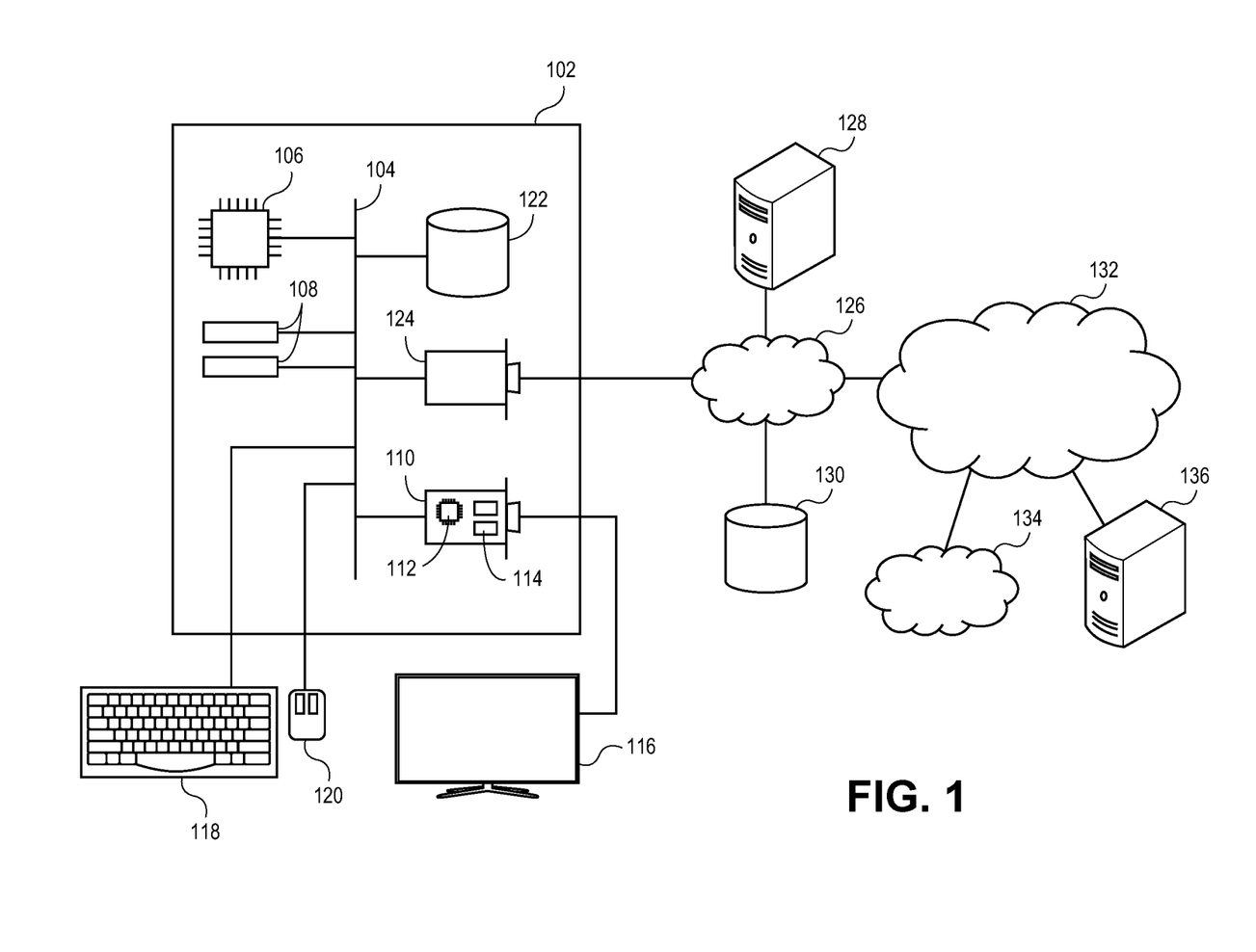
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, in some embodiments, network interface card (NIC) 124 is also optionally attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2A:
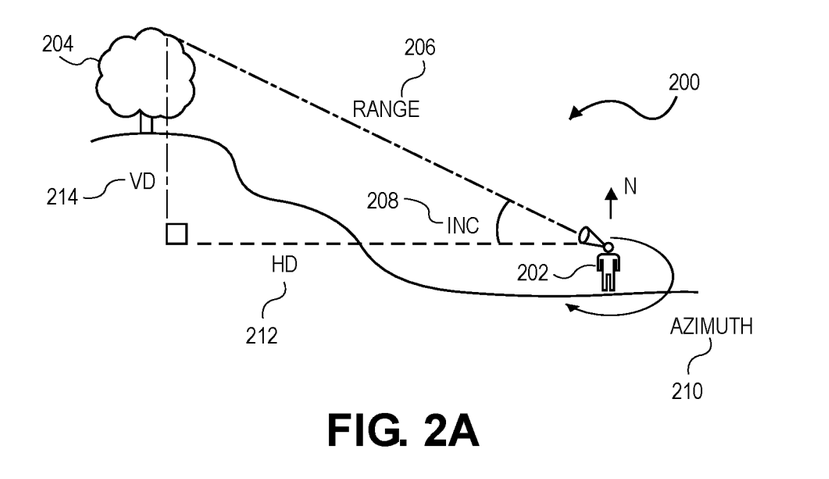
FIG. 2a shows a schematic depiction of a single horizon measurement.

Turning now to FIG. 2a, a schematic depiction of a single horizon measurement is depicted and referred to generally by reference numeral 200. As depicted, observer 202 is equipped with a rangefinder, inclinometer, and compass. In some embodiments, the compass and inclinometer are integrated into a portable rangefinder such as a laser rangefinder. In other embodiments, only the rangefinder and compass, the rangefinder and the inclinometer, or the compass and the inclinometer are used. In order to take the measurement, observer 202 sights on horizon point 204. Horizon point 204 may be any point of locally maximum altitude visible to observer 202. For example, in a particular arbitrarily chosen direction, there may be a four-story building, and the operator can sight on the roofline of that building as a horizon point. In another arbitrarily chosen direction, a mountain peak may be the chosen horizon point. In a third arbitrarily chosen direction, a tree silhouetted against the sky may be the horizon point. In some embodiments, multiple horizon points may be possible for a given azimuth (i.e., sub-horizons). For example, a building may be silhouetted against a cliff, which is in turn silhouetted against a mountain. Observer 202 may select the roofline of the building sub-horizon, the cliff line sub-horizon, or the mountain peak visible horizon as horizon point 204. In some embodiments, the set of available horizon points may be limited to those exhibiting local maxima. For example, the corner of a building, a mountain peak, chimney, or other building feature may be selected.

Once observer 202 selects an appropriate horizon point 204, the range 206, inclination angle 208 and/or azimuth 210 to horizon point 204 can be captured. Based on inclination angle 208 and range 206, horizontal distance 212 for horizon point 204 can be calculated using trigonometry as the product of range 206 and the cosine of the inclination angle 208, and the vertical distance 214 of the horizon point 204 can be calculated as the product of range 206 and the sine of the inclination angle 208. In some embodiments, the height of the operator can be compensated for if the operator is not standing directly on the terrain. For example, if the operator is standing on top of a car or in on an elevated floor of a building, their altitude can be determined (for example, by an integrated altimeter). Then, once horizontal distance 212 and vertical distance 214 have been calculated, the operator's altitude above the surface of the terrain can be added to vertical distance 214 and inclination 208 (or the other measurements being used) can be recalculated based on the adjusted operator's position. A POSITA will understand that the right triangle formed in three-dimensional space by range 206, horizontal distance 212, and vertical distance 214 can be determined in a variety of ways including measurements of various sides and angles, and that any such way of measuring this right triangle is contemplated as being within the scope of the invention.

Figure 2B:
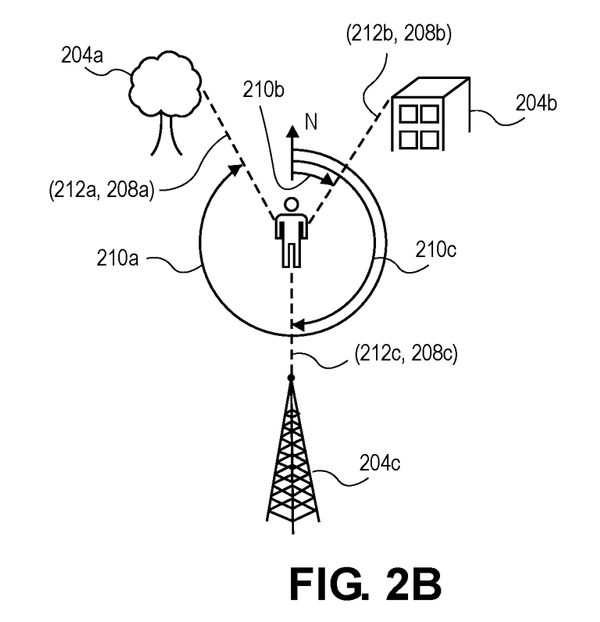
FIG. 2b depicts an overhead view of an observer capturing a plurality of horizon measurements to a respective plurality of horizon points.

Turning now to FIG. 2b, an overhead view of observer 202 capturing a plurality of horizon measurements to a respective plurality of horizon points 204a, 204b and 204c is depicted. In various embodiments of the invention, different numbers of measurements may be required to increase accuracy. For example, in a local environment with a single distinctive feature (such as a tall antenna structure), a single horizon measurement on the top of that feature may uniquely determine the operator's position, simply because there are no other features with a comparable vertical distance 214. However, in the general case (such as an urban environment) multiple measurements will be required to narrow the set of candidate positions until sufficient accuracy is reached. By virtue of the iterative algorithms described below, however, the operator can simply repeatedly sight on additional horizon point until the system can identify their position with sufficient accuracy.

In some embodiments, the rangefinder (in the form of an optical or laser rangefinder), compass and inclinometer can be integrated into a head-mounted display. In such an embodiment, the operator can simply move a reticle of the head-mounted display over a horizon point, trigger a measurement, and repeat. In a variant of such an embodiment, a digital video camera could automatically detect a horizon edge crossing the aim point of a laser rangefinder and trigger a measurement without requiring any intervention by the operator. The azimuth and inclination for the measurement can be determined using existing pose estimation techniques for a head-mounted display, as described in commonly assigned U.S. Pat. No. 9,767,577, the disclosure of which is hereby incorporated by reference. In other embodiments, the rangefinder may be a rifle-mounted laser rangefinder which can use a scope of the rifle for aiming the laser. In still other embodiment, the rangefinder may be a standalone handheld or tripod-mounted unit.

Figure 3:
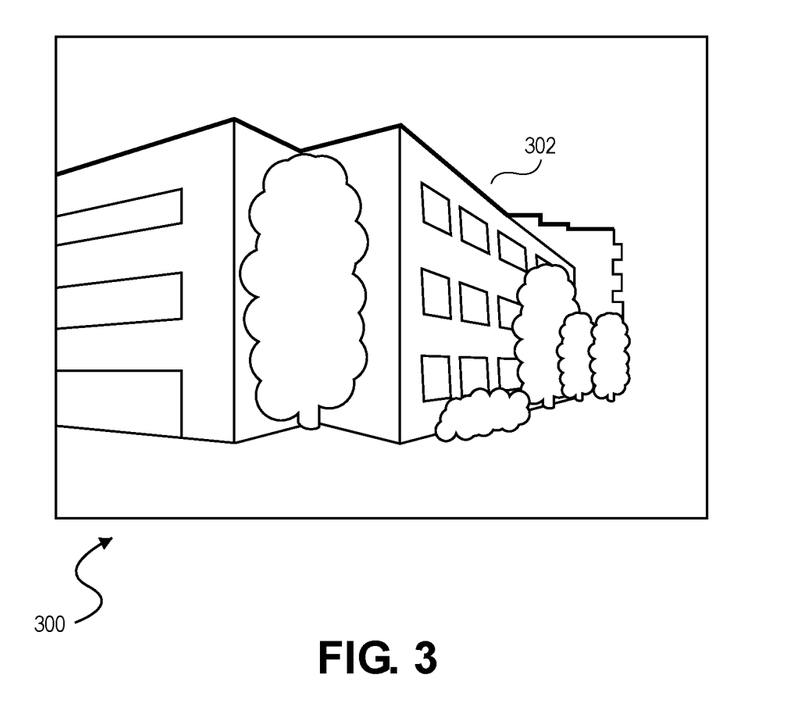
FIG. 3 shows a schematic depiction of a portion of a computed visible horizon.

Turning now to FIG. 3, a schematic depiction of a portion of a computed visible horizon is depicted and referred to generally be reference numeral 300. In some embodiments, prior to use, such computed visible horizons are computed for an area of operations. For example, a height map of an area may be available based on satellite data, radar or lidar overflights, scanning laser mapping, stereo photogrammetry from aerial surveys, or any other source of data. In some embodiments, this height map is generated from a point cloud. This can be done using, for example, Delaunay triangulation to generate a mesh, which can be used to generate a gridded height map or used directly to compute visible horizons as described below. This height map may also be referred to as a digital surface model or DSM. Unlike a digital terrain model (or DTM) the DSM includes buildings and other surface objects.

Given a height map for an area of interest, a grid of equally spaced ground points can be overlain on the area of interest and used to compute visual horizons for each point of the grid. In some embodiments, the grid is a rectilinear grid. In other embodiments, the grid is a triangular grid. In still other embodiments, the grid may be irregular and/or supplemented by observed visual horizons at particular points. For each point on the grid, the visual horizon can be pre-computed. For example, where a height mesh is employed, raycasting can be used to determine where the skybox is hidden by the ground mesh. A POSITA will appreciate that a variety of techniques for hidden surface removal can be repurposed to compute the visual horizon 302 for each point of the grid in an efficient manner. The resulting set of computed visual horizons for each grid point can be stored in a compact data store for use in the field as described below It is one advantage of certain embodiment of the invention that, because this data store is sufficiently compact, it can be stored locally (e.g., on the operator's mobile device or on a discrete geolocation device) and no network access is required to perform the geolocation process. Alternatively, the data can be received over a network interface of the system in real time.

Figure 4:
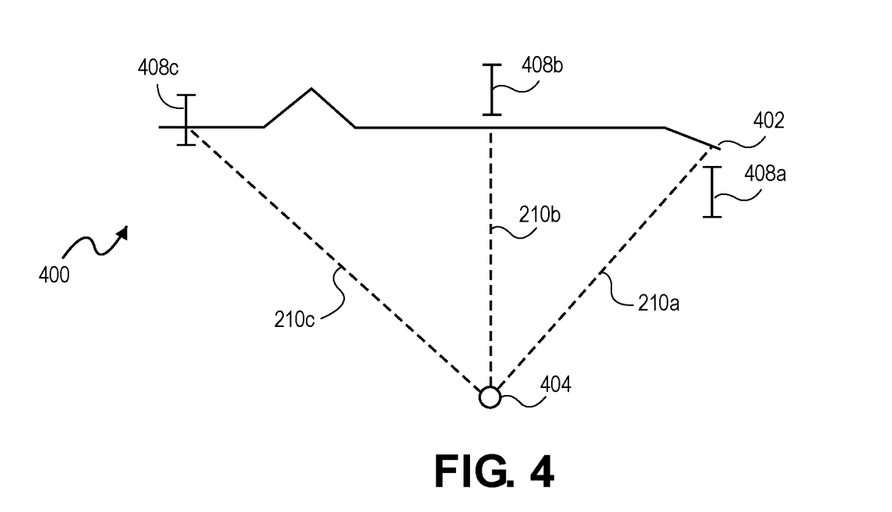
FIG. 4 shows a schematic depiction of the process of filtering and rejecting a candidate grid point based on inclination measurements of the visible horizon.

Turning now to FIG. 4, a schematic depiction of the process of filtering and rejecting a candidate grid point based on inclination measurements of the visible horizon is depicted and generally referred to by reference numeral 400. As shown, this process involves filtering the set of computed visual horizons for the set of all grid points to identify candidate grid points for the operator's location based on measurements of the inclination angles 208a, 208b, and 208c and azimuths 210a, 210b and 210c for each of the respective horizon points 204a, 204b, and 204c. In particular, FIG. 4 depicts the filtering process for filtering and rejecting a first candidate grid point. Horizon line 402 corresponds to the computed visible horizon for a first grid point 404, with the x-axis representing the azimuth and the y-axis depicting the inclination of the computed visible horizon at the corresponding azimuth.

As shown, the inclination ranges 408a, 408b, and 408c corresponding to the horizon points 204a, 204b, and 204c are illustrated centered at the corresponding inclination and azimuth coordinates, with a vertical error bar corresponding to an error tolerance for the measurement. Thus, for example, the horizon line 402 falls within inclination range 408c, but outside of inclination ranges 408a and 408b. This indicates that the measured inclination angle 208c for horizon point 204c is close to the visible horizon at the corresponding azimuth angle 210c. However, because horizon line 404 does not fall within inclination range 408a or 408b, the measured inclination angles 208a and 208b are not close to the visible horizon at azimuth points 210a and 210b. Thus, grid point 404 matches only one of three inclination measurements and is unlikely to be the location of the operator when taking those measurements. In some embodiments, a grid point is rejected if it fails to match any single inclination measurement. In such an embodiment, these rejections may be made dynamically and iteratively. Thus, for example, because grid point 404 failed to match the computed visible horizon for measured horizon point 204a, it would be eliminated from the pool of candidate grid points immediately and never compared against measured horizon points 204b and 204c. In other embodiments, two or more failures may be required before a grid point is eliminated from the pool of candidate grid points. In still other embodiments, all measurements are tested for each grid point and the pool of candidate grid points is the set of grid points with the highest number of matches.

Figure 5:
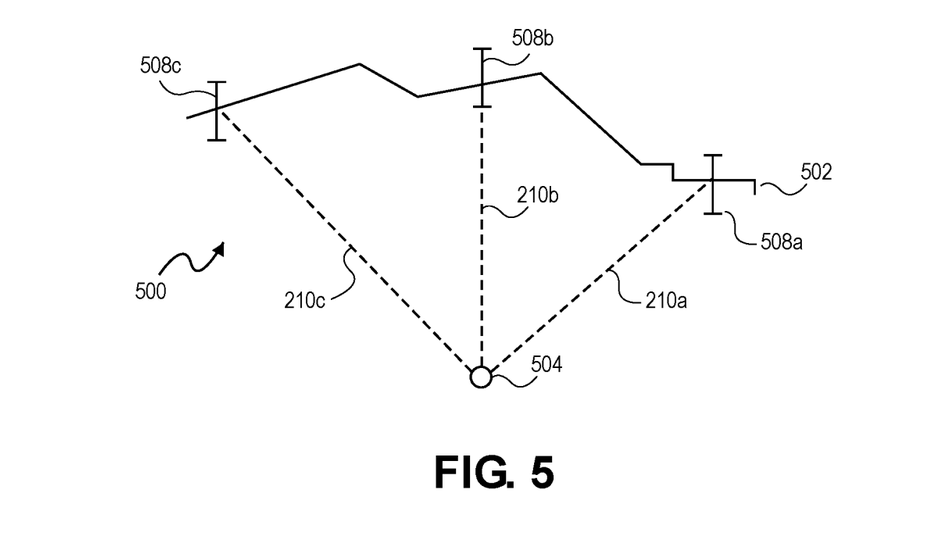
FIG. 5 shows a schematic depiction of the process of filtering and passing a candidate grid point based on inclination measurements of the visible horizon.
Figure 8:
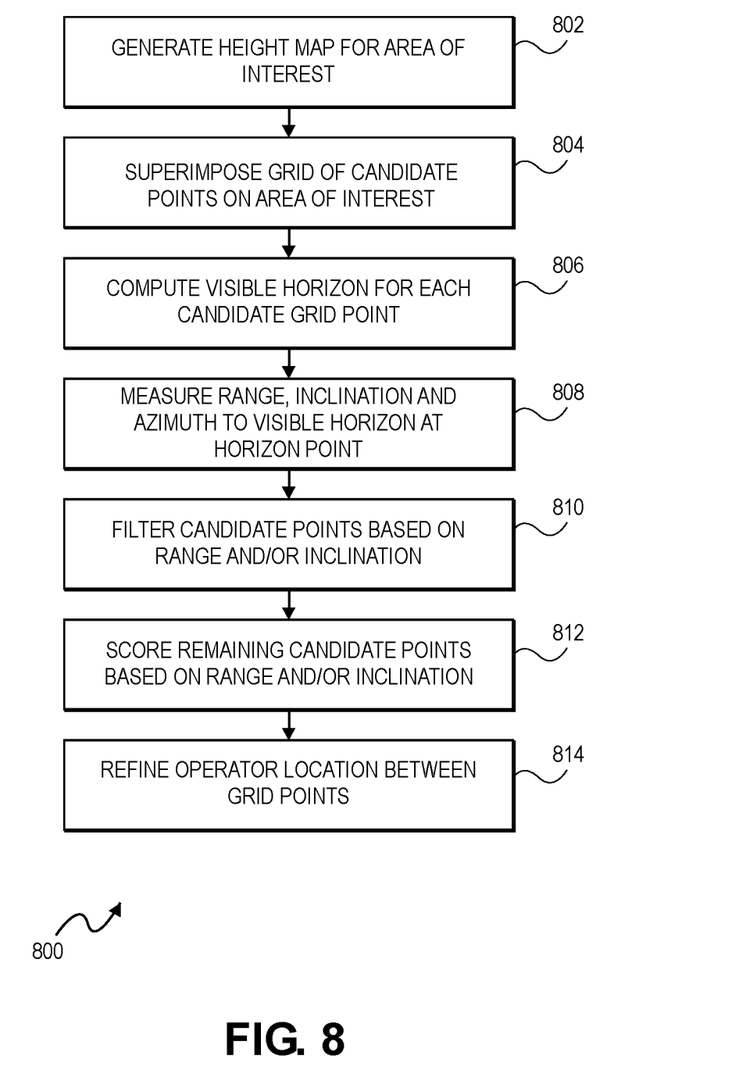
FIG. 8 depicts a flowchart illustrating the operation of a method in accordance with one embodiment of the invention.

Turning now to FIG. 5, a schematic depiction of the process of filtering and passing a candidate grid point based on inclination measurements of the visible horizon is depicted and generally referred to be reference numeral 500. As with the process depicted in schematic 400, schematic 500 depicts comparing a computed visible horizon line 502 for a grid point 504 to the inclination angles 208a, 208b, and 208c and azimuths 210a, 210b and 210c for each of the respective horizon points 204a, 204b, and 204c. In this example, the horizon line 502 falls within inclination ranges 508a, 508b and 508c. This indicates that the measured inclination angles 208a, 208b and 208c are close to the visible horizon at azimuth points 210a, 210b, and 210c. Thus, grid point 504 matches all three inclination measurements and is one possibility for the location of the operator when taking these measurements. As such, grid point 504 is passed through for further filtering and, if it passes each filter, for sorting as described below with respect to the method of flowchart 800. In some embodiments, this means that grid point moves on to the step of scoring, as described below. In other embodiment, the grid point is still further filtered based on the horizontal distance measurements to the visible horizon, as described below. In still other embodiments, horizontal distance measurement filtering may optionally be performed based on the number of grid points remaining as candidates after inclination measurement filtering. In yet other embodiments, horizontal distance measurement filtering is performed first, and inclination measurement is optionally performed afterwards.

Figure 6:
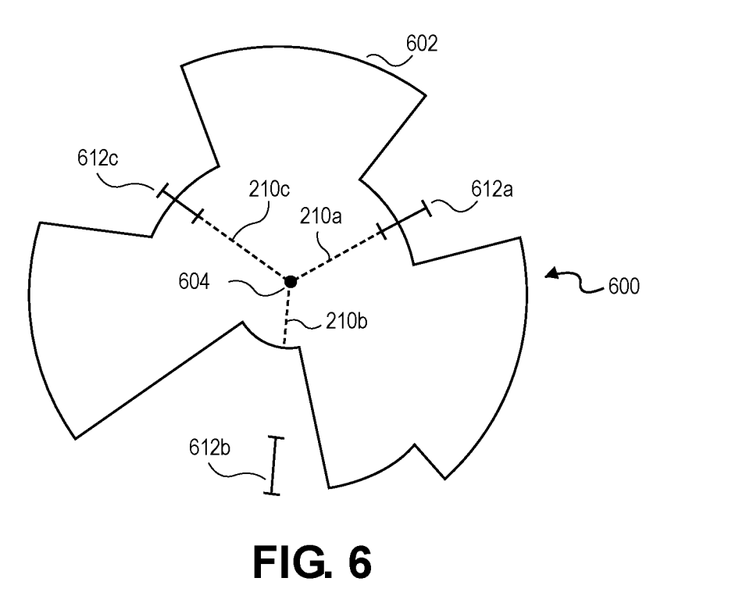
FIG. 6 shows a schematic depiction of the process of filtering and rejecting a candidate grid point based on the horizontal distance measurements to the visible horizon.

Turning now to FIG. 6, a schematic depiction of the process of filtering and rejecting a candidate grid point based on the horizontal distance measurements to the visible horizon is depicted and generally referred to by reference numeral 600. As shown, this process involves filtering the set of computed visual horizons for the set of all grid points to identify candidate grid points for the operator's location based on measurements of the horizontal distances 210a, 210b, and 210c and azimuths 210a, 210b and 210c for each of the respective horizon points 204a, 204b, and 204c. Schematic diagram 600 shows a radial distance line 602 illustrating the horizontal distance from a candidate grid point 604 to the visible horizon as a function of the azimuth. Also shown are radial horizontal distance ranges 612a, 612b and 612c at azimuths 210a, 210b, and 210c, corresponding to measured horizon points 204a, 204b and 204c. These horizontal distance ranges each correspond to the (calculated) measured distance to the respective horizon point plus and minus an error tolerance. As depicted, radial distance line 602 falls within horizontal distance ranges 612a and 612c, but outside of horizontal distance range 612b. This means that the distances to the visible horizons at grid point 604 are close to the (calculated) distances measured by the observer at azimuths 210a and 210c, but not close at azimuth 210b. In some embodiments, because grid point 604 failed to match measured horizon point 204b, it would be eliminated from the pool of candidate grid points. In other embodiments, two or more failures (for horizontal distance or combined between horizontal distance and inclination) are required to eliminate a candidate point from the candidate pool.

Figure 7:
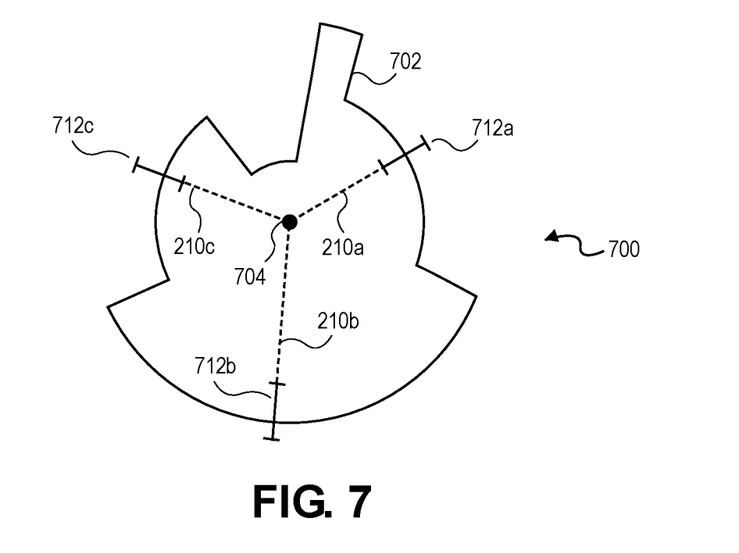
FIG. 7 shows a schematic depiction of the process of filtering and passing a candidate grid point based on horizontal distance measurements to the visible horizon.

Turning now to FIG. 7, a schematic depiction of the process of filtering and passing a candidate grid point based on horizontal distance measurements to the visible horizon is depicted and generally referred to be reference numeral 700. As in schematic diagram 600, radial distance line 702 illustrated the horizontal distance from candidate grid point 704 to the visible horizon as a function of the azimuth and horizontal distance ranges 712a, 712b, and 712c at azimuths 210a, 210b, and 210c, corresponding to measured horizon points 204a, 204b and 204c illustrate to the (calculated) measured distance to the respective horizon point plus and minus an error tolerance. As depicted, radial distance line 702 falls within horizontal distance ranges 712a, 712b, and 712c. This means that the distances to the visible horizons at grid point 704 are close to the (calculated) distances measured by the observer at azimuths 210a, 210b, and 210c. As such, in some embodiments, candidate grid point 704 will remain in the pool of candidate grid points. In other embodiments, candidate grid point 704 will remain in the pool of candidate grid point only it passes the process of filtering and based on inclination measurements of the visible horizon as well.

Turning now to FIG. 8, a flowchart illustrating the operation of a method in accordance with one embodiment of the invention is depicted and referred to generally by reference numeral 800. Initially, a step 802, a height map for the area of interest is created. As described above with reference to FIG. 3, this may be done based on a point cloud generated by radar, LIDAR, and/or any other suitable technique for topographic measurements. The height map itself may be a gridded map, a triangulated mesh, a #D wireframe/solid model of the terrain and manmade structures or any other way of indicating how the visible horizon can be determined from an arbitrary point within the area of interest.

Next at step 804, a grid of candidate points is superimposed on the area of interest. In some embodiments, an equally spaced square grid is used. In other embodiments, a triangular or hexagonal grid is used instead. In still other embodiments, an irregular grid (for example, a grid based on or aligned to points actually surveyed) is used instead. In some embodiments, grid points spaced at 2 m are used. In other embodiments, alternate spacings such as 1 m, 3 m, or 5 m can be used instead. A POSITA will appreciate that more closely spaced grid points can increase accuracy but require additional processing for precomputing visible horizons and for filtering and sorting.

Once the grid of candidate points is established, processing can proceed to step 806, where visible horizons are computed for each grid point. Techniques for determining the visible horizons from the height map are discussed above, and can include raycasting, hidden surface removal, and z-buffering. In this application, a complete rendering of visible faces (e.g., the surrounding scenery) is unnecessary, and only the lowest point at which the skybox is occluded for a given azimuth need be determined. As such, binary searching with raycasting can be used to quickly determine the horizon point fora given azimuth. Other techniques are also possible. Steps 802, 804, and 806 can be precalculated for the area of interest and stored in a geospatial data store to speed up the location process after measurement.

When the time comes to determine the position of the observer, processing resumes at step 808. There, the observer measures the inclination and range to the visible horizon at a particular azimuth. Although the embodiment described herein employs both range and angle measurements, alternate embodiments may employ only range or only angle measurements. Furthermore, although the embodiment described below describes position estimation using three horizon point measurements, any number of horizon points can be used. In particular, some embodiments may iteratively filter candidate points as the operator collects additional measurements until the candidate pool is sufficiently reduced. As described above, the range to the horizon point is measured together with the inclination for an arbitrarily selected azimuth. The horizontal distance is then calculated using the range and the inclination by multiplying the range by the cosine of the inclination angle, and the horizontal distance and inclination angle are used in position estimation. However, in alternate embodiments other elements of the triangle depicted in FIG. 2a can be used instead without departing from the scope of the invention.

Once the operator has taken the measurement(s), processing proceeds to step 810 where the set of grid points is first filtered based on the measured (and/or calculated) horizontal distance, inclination, and altitude as described above with respect to FIGS. 4-7. In some embodiments, the resulting candidate pool is passed to sorting step 812 below regardless of size. In other embodiments, if too many points remain in the candidate pool, the operator's position is considered excessively ambiguous, and the operator is prompted to measure additional horizon points to narrow the candidate pool.

Next, at step 812, each point remaining in the candidate pool is scored to measure the residual (error) between each candidate point and the horizontal distance and inclination measured by the operator. In particular, the raw error for the horizontal distance (HD) and inclination (INC) can be calculated by taking the absolute value of the difference between the measured value (indicated by a subscripted m) and the calculated value for the grid point (indicated by a subscripted g and a (to indicate the angle for the grid point)):

$$R_{HD}(m,g,\alpha)=|HD_m-HD_{g,\alpha}|, R_{INC}(m,g,\alpha)=|INC_m-INC_{g,\alpha}|$$

These values can be weighted to normalize them by dividing by the largest residual value over all of the candidate points:

$$W_{HD} = \max_m R_{HD}(m, g, \alpha), \quad W_{INC} = \max_m R_{INC}(m, g, \alpha)$$

The score for a particular grid point then becomes the sum of the horizontal distance residuals divided by the maximum horizontal distance residual for all candidate points, plus the sum of the inclination residuals, divided by the maximum inclination residual over all points:

$$S(g) = \frac{1}{W_{HD}} \sum_m R_{HD}(m, g, \alpha) + \frac{1}{W_{INC}} \sum_m R_{INC}(m, g, \alpha)$$

The grid point with the lowest score is determined to be the closed grid point to the operator's position and passed to the refinement step 814 below.

Refinement step 814 localizes the operator further between grid points. In this step, a three-dimensional model of the visible horizon, as viewed from the vicinity of the closest grid point is generated. In some embodiments, the mesh of the height map originally used to calculate the visible horizons for each grid point may be used. In other embodiments, wireframe models of the surroundings (such as the buildings) can be used instead or in addition. This allows for the calculation of horizontal distance and inclination from arbitrary points. In some embodiments, mesh lines may be transformed into polar coordinates for ease of calculation. The absolute difference between the measured (calculated) horizontal distance and inclination and the simulated horizontal distance and inclination can then be minimized. In some embodiments, the score function from sorting step 810 can be reused as a function of two variables (such as the latitude and longitude or the UTM coordinates):

$$S(x, y) = \frac{1}{W_{HD}} \sum_m |HD_m - HD_{x,y,\alpha}| + \frac{1}{W_{INC}} \sum_m |INC_m - INC_{x,y,\alpha}|$$

This function can then be optimized to find a local minimum error. In some embodiments, a simplex search can be used to quickly compute this minimum. The resulting point with the locally minimal error, which may be a point that is not a grid point, is then the best estimate of the operator's position.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method for determining the location of an operator, comprising the steps of:
receiving a first range, a first inclination and a first azimuth of a first point on a visible horizon based on a first measurement by the operator;
filtering a set of grid points based on the first inclination and the first azimuth by eliminating from consideration a candidate grid point of the set of grid points if a computed inclination at the first azimuth for the candidate grid point varies by more than an inclination error threshold from the first inclination;
further filtering the set of grid points based on the first range and the first azimuth by eliminating from consideration the candidate grid point if a computed range at the first azimuth for the candidate grid point varies by more than a range error threshold from the first range;
determining a best grid point of the set of grid points by determining that the best grid points has a minimal weighted residual sum over the candidate grid points; and
refining the location of the operator based on the best grid point by determining a refined location with a smaller weighted residual sum than the best grid point.

2. The method of claim 1, further comprising the steps of:
receiving a second range, a second inclination and a second azimuth of a second point on a visible horizon based on a second measurement by the operator;
filtering the set of grid points based on the second inclination and the second azimuth by eliminating from consideration the candidate grid point if a computed inclination at the second azimuth for the candidate grid point varies by more than the inclination error threshold from the second inclination;
further filtering the set of grid points based on the second range and the second azimuth by eliminating from consideration the candidate grid point if a computed range at the second azimuth for the candidate grid point varies by more than a range error threshold from the second range.

3. The method of claim 1, wherein the range is a horizontal distance.

4. The method of claim 1, wherein the refined location does not correspond to a grid point.

5. The method of claim 1, where the step of refining is performed using a simplex method starting with the best grid point.

6. The method of claim 1, wherein the range is measured using a laser rangefinder.

7. The method of claim 1, wherein the computed range and the computed inclination are computed based on a height map generated by using a point cloud.

8. One or more non-transitory computer-readable media storing computer-executable instruction that, when executed by a processor, perform a method of determining a location of an operator, the method comprising the steps of:
receiving a first range, a first inclination and a first azimuth of a first point on a visible horizon based on a first measurement by the operator;
filtering a set of grid points based on the first inclination and the first azimuth by eliminating from consideration a candidate grid point of the set of grid points if a computed inclination at the first azimuth for the candidate grid point varies by more than an inclination error threshold from the first inclination;
further filtering the set of grid points based on the first range and the first azimuth by eliminating from consideration the candidate grid point if a computed range at the first azimuth for the candidate grid point varies by more than a range error threshold from the first range;
receiving a second range, a second inclination and a second azimuth of a second point on a visible horizon based on a second measurement by the operator;
further filtering the set of grid points based on the second inclination and the second azimuth by eliminating from consideration the candidate grid point if a computed inclination at the second azimuth for the candidate grid point varies by more than the inclination error threshold from the second inclination;
further filtering the set of grid points based on the second range and the second azimuth by eliminating from consideration the candidate grid point if a computed range at the second azimuth for the candidate grid point varies by more than a range error threshold from the second range;

determining a best grid point of the set of grid points by determining that the best grid points has a minimal weighted residual sum over the candidate grid points; and refining the location of the operator based on the best grid point by determining a refined location with a smaller weighted residual sum than the best grid point.

9. The media of claim 8, wherein the range is a horizontal distance.

10. The media of claim 8, wherein the refined location does not correspond to a grid point.

11. The media of claim 8, where the step of refining is performed using a simplex method starting with the best grid point.

12. The media of claim 8, wherein the computed inclination at the first azimuth for the candidate grid point and the computed range at the first azimuth for the candidate grid point are precomputed and stored on the computer-readable media.

13. The media of claim 8, wherein the computed range and the computed inclination are computed based on a height map generated by using a point cloud.

14. A system for determining the position of an operator, comprising:
   a processor;
   a display;
   a laser rangefinder;
   an inclinometer;
   a compass; and
   one or more non-transitory computer-readable media storing computer-executable instruction that, when executed by the processor, perform a method of determining a location of an operator, the method comprising the steps of:
      receiving a first range from the laser rangefinder, a first inclination from the inclinometer and a first azimuth from the compass of a first point on a visible horizon based on a first measurement by the operator;
      filtering a set of grid points stored on the computer-readable media based on the first inclination and the first azimuth by eliminating from consideration a candidate grid point of the set of grid points if a computed inclination at the first azimuth for the candidate grid point varies by more than an inclination error threshold from the first inclination;
      further filtering the set of grid points based on the first range and the first azimuth by eliminating from consideration the candidate grid point if a computed range at the first azimuth for the candidate grid point varies by more than a range error threshold from the first range;
      determining a best grid point of the set of grid points by determining that the best grid point has a minimal weighted residual sum over the candidate grid points;
      refining the location of the operator based on the best grid point by determining a refined location with a smaller weighted residual sum than the best grid point; and
      displaying the refined location of the operator on the display.

15. The system of claim 14, wherein the method further comprises the steps of:
   receiving a second range from the laser rangefinder, a second inclination from the inclinometer and a second azimuth from the compass of a second point on a visible horizon based on a second measurement by the operator;
   filtering the set of grid points based on the second inclination and the second azimuth by eliminating from consideration the candidate grid point if a computed inclination at the second azimuth for the candidate grid point varies by more than the inclination error threshold from the second inclination;
   further filtering the set of grid points based on the second range and the second azimuth by eliminating from consideration the candidate grid point if a computed range at the second azimuth for the candidate grid point varies by more than a range error threshold from the second range.

16. The system of claim 15, wherein the computed inclination at the first azimuth for the candidate grid point, the computed range at the first azimuth for the candidate grid point, the computed inclination at the second azimuth for the candidate grid point, and the computed range at the second azimuth for the candidate grid point are stored in a data store on the computer-readable media.

17. The system of claim 14, wherein the refined location does not correspond to a grid point.

18. The system of claim 14, where the step of refining is performed using a simplex method starting with the best grid point.

19. The system of claim 14, wherein the computed range and the computed inclination are computed based on a height map generated by using a point cloud.

20. The system of claim 14, wherein the laser rangefinder, the inclinometer, and the compass are located in a single integrated housing.

* * * * *